Dec. 27, 1955          L. BOCEK          2,728,464
DRAFT GEAR
Filed Nov. 13, 1951
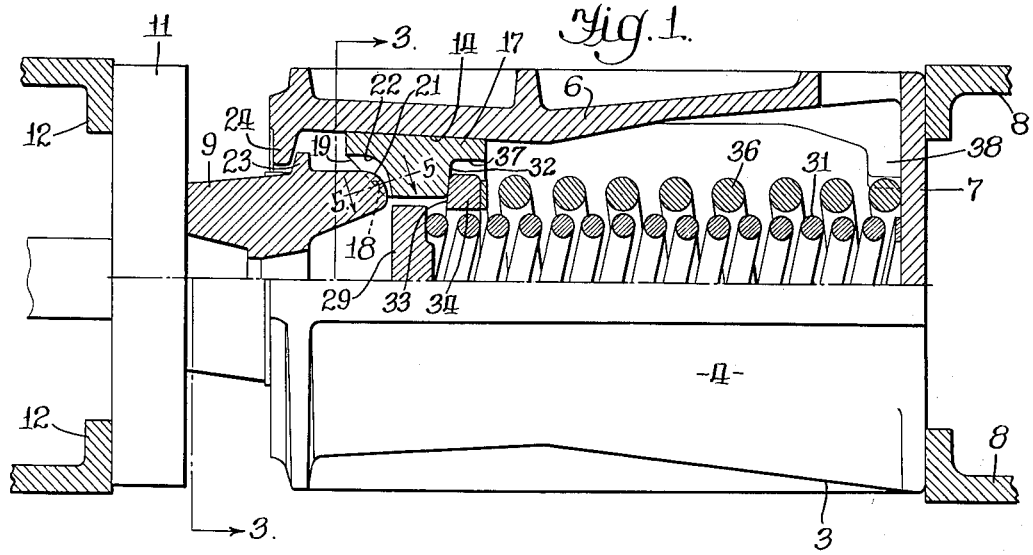
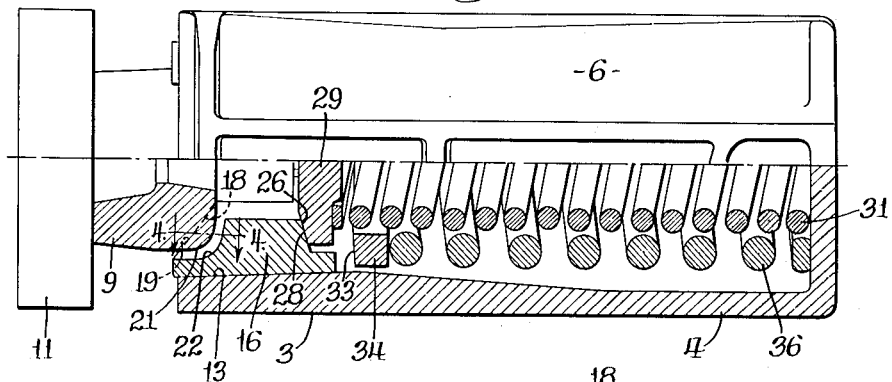
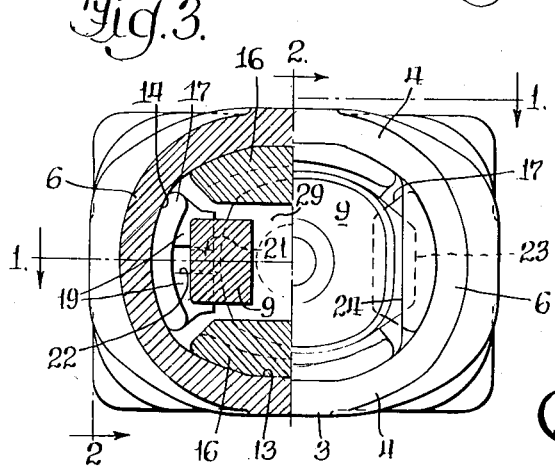
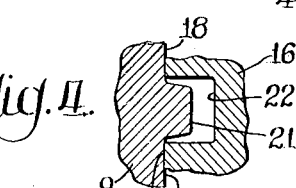
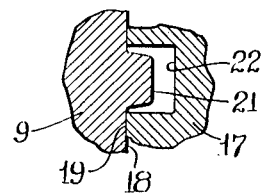
INVENTOR.
Leonard Bocek
BY
Orrin O. B. Garner
Atty.

United States Patent Office 2,728,464
Patented Dec. 27, 1955

2,728,464
DRAFT GEAR

Leonard Bocek, Chicago, Ill., assignor to American Steel Foundries, Chicago, Ill., a corporation of New Jersey Application November 13, 1951, Serial No. 256,019

6 Claims. (Cl. 213—32)

This invention relates to railway draft gears and is more particularly concerned with the provision of a draft gear of the barrel type embodying resilient means and friction means assembled within a housing to absorb and dissipate the energy of shock loads transmitted thereto from the coupler.

Briefly, the present invention contemplates the provision of a draft gear embodying an elongated tubular housing having an end wall and an oval shape friction end and adapted to receive a pair of helical compression springs and two pair of friction shoes radially disposed around and interlocked with a follower wedge, the wedge being normally disposed at rest against stop lugs formed on the friction end of the housing and movable toward the end wall of the housing to wedge the shoes into frictional engagement with the housing and to siumltaneously compress the springs.

This invention further contemplates the provision of a draft gear in which each helical spring is compressed by a pair of diametrically opposed friction shoes responsive to inward movement of the follower wedge relative to the housing.

This invention further contemplates the provision of a draft gear in which a spring cap is interposed between each compression spring and its associated pair of friction shoes, each spring cap and its related pair of shoes having complementary surfaces disposed to bias the shoes radially into engagement with inwardly converging concave friction surfaces formed along the friction end of the housing.

This invention further contemplates the provision of a draft gear in which the housing is formed with a substantially oval shape friction end to provide a pair of relatively large diametrically opposed friction surfaces engaged by a pair of outer friction shoes, and a pair of small diametrically opposed friction surfaces engaged by a pair of inner friction shoes. The friction surfaces are formed and arranged to prevent rotational movement of the shoes and follower wedge within the bore of the housing, and thus permits the use of a bayonet interlock between the housing and the follower wedge.

This invention further contemplates the provision of a draft gear in which the several clutch parts are formed and arranged to provide greater spring travel and capacity and to effect a saving in the cost of manufacture.

This invention embodies other novel features, details of construction and arrangement of parts which are hereinafter set forth in the specification and claims and illustrated in the accompanying drawing wherein:

Figure 1 is a view half in top plan and half in section, taken along the line 1—1 of Figure 3, illustrating a draft gear embodying features of the present invention;

Figure 2 is a view half in side elevation and half in section, taken along the line 2—2 of Figure 3;

Figure 3 is a transverse sectional view taken along the line 3—3 of Figure 1;

Figure 4 is a fragmentary sectional view taken along the line 4—4 of Figure 2, and Figure 5 is a fragmentary sectional view taken along the line 5—5 of Figure 1.

Referring now to the drawing for a better understanding of the present invention, the draft gear is shown as comprising an elongated housing 3 of generally elliptical cross section having arcuate top and bottom walls 4—4 merging with arcuate side walls 6—6 and closed at one end by a rectangular rear wall 7 adapted to engage rear draft lugs 8 secured on a railway car body (not shown). A follower wedge 9 is disposed within the open end of the housing 3 and seated against a front follower 11 compressed against front draft lugs 12 on the car body.

Adjacent the open end of the housing 3 the top and bottom walls 4—4 are formed with concave, diametrically opposed, inwardly converging friction surfaces 13—13 which merge with relatively small, concave, diametrically opposed, inwardly converging friction surfaces 14—14 formed on the side walls 6—6. A pair of identical outer friction shoes 16—16 are disposed within the housing to engage their respective friction surfaces 13—13, and a pair of identical inner friction shoes 17—17 are positioned within the housing to engage their respective friction surfaces 14—14, the friction shoes having friction faces substantially complementary to their respective friction surfaces.

The inner end of the follower wedge 9 is formed with inwardly converging seats 18 to engage complementary seats 19 formed on the outer ends of the inner and outer friction shoes 16—16 and 17—17. The follower wedge 9 is also formed with a plurality of tongues 21 positioned within grooves 22 formed in the outer ends of the friction shoes. A pair of diametrically opposed stop lugs 23—23 are formed on the wedge 9 for abutting engagement against the inner sides of a pair of diametrically opposed abutment webs 24—24 formed on the side walls 6—6 of the housing 3, the lugs and webs forming a bayonet connection to interlock the wedge within the housing.

The inner ends of the outer friction shoes 16—16 are formed with diagonal outwardly diverging faces 26—26 for complementary engagement with tapered wedge surfaces 28—28 formed on the outer face of an outer spring cap 29 shown in form of an elliptical-shaped disc. A helical inner compression spring 31 is disposed within the housing 3 between the back wall 7 and the outer spring cap 29 to urge the outer friction shoes into tight engagement against the follower wedge 9.

The inner ends of the inner shoes 17—17 are formed with outwardly diverging faces 32—32 for engagement with a frusto-conical surface 33 on an inner spring cap 34 which is in the form of a ring encircling the inner compression spring 31. Interposed between the back wall 7 and the inner spring cap 34 is provided a helical outer compression spring 36 which serves to maintain the inner friction shoes 17—17 in engagement with the follower wedge 9. The inner spring cap 34 and the adjacent end of the outer compression spring 36 are retained in position by lips 37—37 formed on the inner ends of the inner friction shoes 17—17, while the other end of the spring is engaged between lugs 38—38 formed on the housing adjacent the wall 7. It will also be noted that the inner spring 31 is retained in position by the inner spring cap 34 and outer spring 36.

In the assembly of the draft gear thus shown and described, the springs 31 and 36, spring caps 29 and 34 and friction shoes 16—16 and 17—17 are mounted within the housing 3. The outer friction shoes 16—16 are then pushed into the housing by means of a suitable tool and held in their inner position against the force exerted by the compression springs until the follower wedge 9 is positioned in the housing with its lugs 23—23 in engagement with the abutment webs 24—24. The tool is then moved away from the housing to permit the springs to move the friction shoes into engagement with the wedge 9.

After the draft gear has been assembled in the manner shown and described, it will be noted that the compression springs 31 and 36 act to urge their respective spring caps 29 and 34 and friction shoes 16—16 and 17—17 toward the open end of the housing 3 to normally maintain the follower wedge lugs 23—23 in abutting engagement against the webs 24—24 on the housing. When the follower wedge 9 is moved into the housing responsive to movement of its associated car coupler (not shown), the diagonal faces 18 on the wedge coact with the diagonal surfaces 28—28 and 33—33 on the spring caps to urge the friction shoes 16—16 and 17—17 against their associated friction surfaces 13—13 and 14—14.

During operation of the draft gear, the friction shoes 16—16 and 17—17 are guided along inwardly converging planes and restrained against rotational movement within the housing 3 by the concave friction surfaces 13—13 and 14—14. By providing tongues 21 on the follower wedge 9 for engagement in slots 22 in the friction shoes, the wedge is interlocked against rotational movement relative to the housing during operation of the draft gear.

While this invention has been shown in but one form it is obvious to those skilled in this art that it is not so limited but is susceptible of various changes and modifications without departing from the spirit and scope of the claimed invention.

I claim:

1. In a draft gear, a housing having an elliptical friction end with internal friction surfaces aligned with the long and short axes thereof respectively, a plurality of diametrically opposed friction shoes arranged respectively against opposite friction surfaces, a follower wedge having circumferentially spaced diagonal faces in direct abutting engagement with adjacent ends of all of said shoes, said wedge having interlocking engagement with each shoe and said housing, and resilient means in said housing to urge said shoes into abutting interlocked engagement with said wedge.

2. In a draft gear, a housing having an elliptical friction end with internal friction surfaces aligned with the long and short axes thereof respectively, pairs of diametrically opposed friction shoes arranged respectively against opposite friction surfaces, a follower wedge having circumferentially spaced diagonal wedge faces in direct abutting engagement with adjacent ends of all of said pairs of shoes, said wedge having interlocking engagement with each shoe and said housing, and a pair of springs to urge said shoes into engagement with said wedge faces, each spring compressively engaging one of said pairs of shoes.

3. In a draft gear, a housing having an elliptical friction end with internal friction surfaces aligned with the long and short axes thereof respectively, pairs of diametrically opposed friction shoes arranged respectively against opposite friction surfaces, a follower wedge having pairs of circumferentially and longitudinally spaced diagonal wedge faces in abutting engagement with adjacent ends of all of said pairs of shoes, said wedge having interlocking engagement with each shoe and said housing, and a pair of springs to urge said shoes into engagement with said wedge faces, each spring compressively engaging one of said pairs of shoes, and a spring cap interposed between each spring and its related pair of shoes.

4. In a draft gear, a housing having an elliptical friction end with internal friction surfaces aligned with the long and short axes thereof respectively, pairs of diametrically opposed friction shoes arranged respectively against opposite friction surfaces, a follower wedge having circumferentially and longitudinally spaced diagonal wedge faces in direct abutting engagement with adjacent ends of all of said pairs of shoes, said wedge having interlocking engagement with each shoe and said housing, and a pair of springs to urge said shoes into abutting engagement with said wedge faces, each spring compressively engaging one of said pairs of shoes, and a spring cap interposed between each spring and its related pair of shoes, said caps and shoes having complementary diagonal surfaces disposed to bias the shoes toward their respective friction surfaces.

5. In a draft gear, a tubular housing having a closed end and an open end, the open end of the housing having diametrically opposed pairs of concave friction surfaces merging to define an elliptical bore and converging toward the closed end of the housing, a pair of diametrically opposed inner shoes engaging one pair of friction surfaces, a pair of outer friction shoes engaging the other pair of friction surfaces, the respective pairs of friction shoes being stepped longitudinally of the housing, a follower wedge having longitudinally spaced diagonal wedge surfaces thereon directly engaging each shoe and having a pair of stop lugs provided thereon, a pair of abutment webs on the housing to engage said stop lugs, a tongue and groove interlock between each shoe and said wedge to prevent rotational movement of the wedge relative to the housing, and a pair of helical compression springs within the closed end of the housing to press the shoes into engagement with said wedge and friction surfaces.

6. In a draft gear, a tubular housing having a closed end and an open end, the open end of the housing having diametrically opposed pairs of concave friction surfaces merging to define an elliptical bore and converging toward the closed end of the housing, a pair of diametrically opposed inner shoes engaging one pair of friction surfaces, a pair of outer friction shoes engaging the other pair of friction surfaces, the respective pairs of friction shoes being stepped longitudinally of the housing, a follower wedge having longitudinally spaced diagonal wedge surfaces thereon directly engaging each shoe and having a pair of stop lugs provided thereon, a pair of abutment webs on the housing to engage said stop lugs, a tongue and groove interlock between each shoe and said wedge to prevent rotational movement of the wedge relative to the housing, and a pair of helical compression springs within the closed end of the housing to press the shoes into engagement with said wedge surfaces, one spring acting against one pair of shoes and the other spring acting against the other pair of shoes, and a cap interposed between each pair of shoes and related spring, said shoes having diagonal faces engaged by complementary faces on the caps to bias the shoes against their related friction surfaces.

References Cited in the file of this patent

UNITED STATES PATENTS

| | | |
|---|---|---|
| 2,020,481 | Stuebing | Nov. 12, 1935 |
| 2,222,479 | Cottrell | Nov. 19, 1940 |
| 2,271,080 | Kinne et al. | Jan. 27, 1942 |
| 2,280,428 | Cottrell | Apr. 21, 1942 |
| 2,281,270 | Cottrell | Apr. 28, 1942 |
| 2,307,236 | Pierce | Jan. 5, 1943 |
| 2,588,703 | Cottrell | Mar. 11, 1952 |